United States Patent [19]
Kondo

[11] Patent Number: 4,988,198
[45] Date of Patent: Jan. 29, 1991

[54] METHOD AND APPARATUS FOR MEASURING MICROLEVEL DIFFERENCE

[75] Inventor: Noriyuki Kondo, Kyoto, Japan

[73] Assignee: Dainippon Screen Mfg. Co., Ltd., Japan

[21] Appl. No.: 210,033

[22] Filed: Jun. 22, 1988

[30] Foreign Application Priority Data

Jun. 22, 1987 [JP] Japan ............................. 62-155125

[51] Int. Cl.$^5$ ............................................. G01B 9/02
[52] U.S. Cl. ................................... 356/357; 356/359
[58] Field of Search ............ 356/357, 328, 241, 355, 356/356, 359; 350/162.12, 509

[56] References Cited

U.S. PATENT DOCUMENTS

| | | | |
|---|---|---|---|
| 3,796,497 | 3/1974 | Mathisen et al. | 350/162.12 X |
| 4,254,337 | 3/1981 | Yasujima et al. | 356/357 X |
| 4,615,620 | 10/1986 | Noguchi et al. | 356/355 X |
| 4,744,660 | 5/1988 | Noguchi et al. | 350/509 X |

FOREIGN PATENT DOCUMENTS

107104  5/1986  Japan .................................. 356/357

*Primary Examiner*—Davis L. Willis
*Assistant Examiner*—Matthew W. Koren
*Attorney, Agent, or Firm*—Ostrolenk, Faber, Gerb & Soffen

[57] ABSTRACT

An apparatus for measuring a very small difference comprises a stage for receiving a sample to be measured, a light source illuminating the sample, an optical system for condensing light reflected from the sample, structure for intercepting a portion of the reflected light, a spectroscope for analyzing the condensed reflected light and a detector for detecting spectrum of the analyzed light. Light reflected only from a main surface of the sample is intercepted by the intercepting structure. Thus, the signal to noise ratio of the reflected light is reduced to enhance measurement capability.

2 Claims, 6 Drawing Sheets

METHOD AND APPARATUS FOR MEASURING MICROLEVEL DIFFERENCE

BACKGROUND OF THE INVENTION

1. Field of the Invention

The present invention relates generally to a method of and an apparatus for measuring minute distances or dimensions and, more specifically, it relates to a method of and an apparatus for measuring the distance between two surfaces of a semiconductor wafer. Measurement is performed in a non-destructive and non-contact manner.

2. Description of the Prior Art

Figure 1:
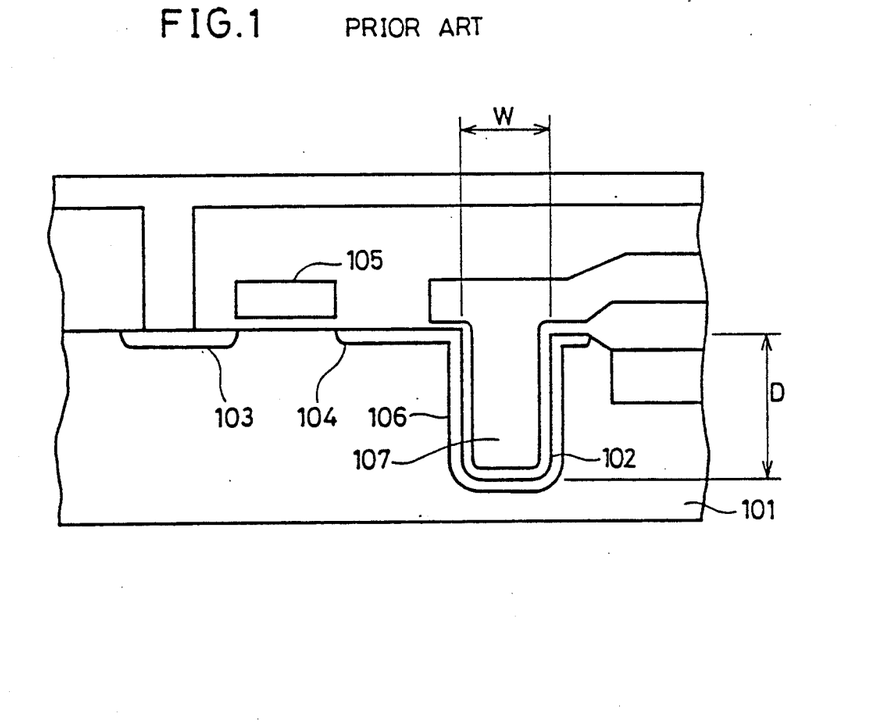
FIG. 1 is a cross sectional view of a DRAM which is an example of an object having a microlevel difference which can be measured by the present invention.

In a dynamic RAM (random access memory) having large storage capacity, trench capacitors are widely employed in order to improve the degree of integration. FIG. 1 is a cross sectional view showing one memory cell of a dynamic RAM having a trench capacitor. Referring to FIG. 1, the dynamic RAM comprises a semiconductor substrate 101 of, for example p-type, having a trench 102, n-type impurity diffused layers 103 and 104 formed on a main surface of the semiconductor substrate 101, a gate electrode 105 formed on a region sandwiched by the n-type impurity diffused layers 103 and 104 with an insulating film interposed therebetween, an n-type impurity diffused layer 106 formed around the trench 102 and connected to the n-type impurity diffused layer 104 and a capacitor electrode 107 formed of polycrystalline silicon formed on the n-type impurity diffused layer 106 with an insulating film interposed therebetween. The n-type impurity diffused layer 106, the capacitor electrode 107 and the insulating film interposed therebetween constitute a trench capacitor. The width W and the depth D (see FIG. 1) of the trench in a highly integrated memory cell are about 1 μm and several μm, respectively. The capacity of the trench capacitor is a function of the depth of the trench. Therefore, in order to govern the characteristic value of a semiconductor memory device of this type, the depth of the trench must be precisely measured in a non-destructive and non-contact manner during manufacture.

Examples of conventional methods for measuring the depth of a trench in a non-destructive or non-contact manner include: the wavelength spectral method and the interference spectral method.

In both of these methods, a microlevel difference at a step portion of a sample surface is measured by detecting spectrum of light reflected from the sample's surface, as will be described later. The former method employs a means for detecting an interference effect. The detecting means is a spectrophotometry means comprising a spectroscope such as a prism, diffraction grating, or the like. The latter method, employs a detecting means which spectrophotometry is a means comprising an interferometer.

Figure 2:
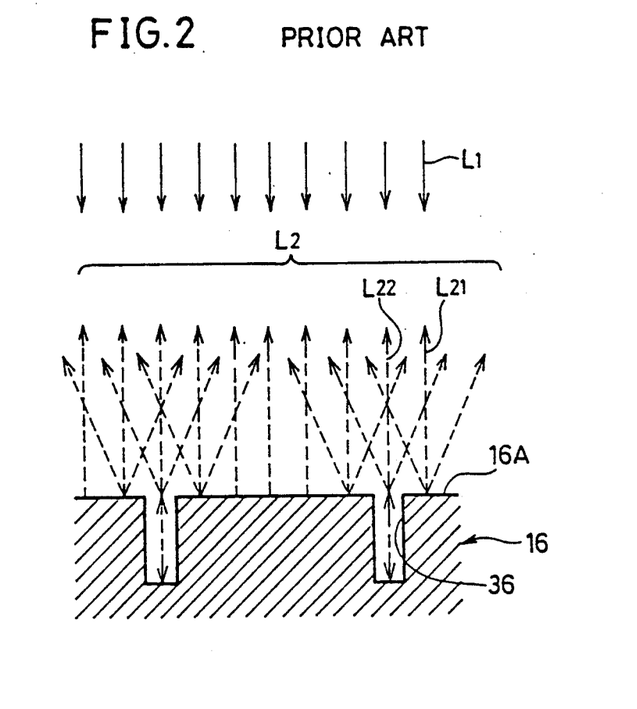
FIG. 2 illustrates a conventional principle of measuring a microlevel difference.

FIG. 2 illustrates the conventional measuring methods.

A micro-trench 36 for forming a trench capacitor, for example, is formed on a surface 16A of a sample 16 of a silicon wafer, for example. Visible white light $L_1$, for example, impinges upon the surface 16a in a direction which is substantially perpendicular to the sample surface 16A.

The visible white light $L_1$ is reflected by a flat surface (upper portion) of the sample surface 16A and from the bottom of the trench 36 (lower portion). Consequently, a phase difference corresponding to the depth of the trench is generated between the light $L_{21}$ reflected from the flat surface of the sample surface 16A and the light $L_{22}$ reflected from the bottom of the trench 36. The amplitude of the reflected light varies depending on the wavelength, of the light thereby generating an interferenced light.

Figure 3A:
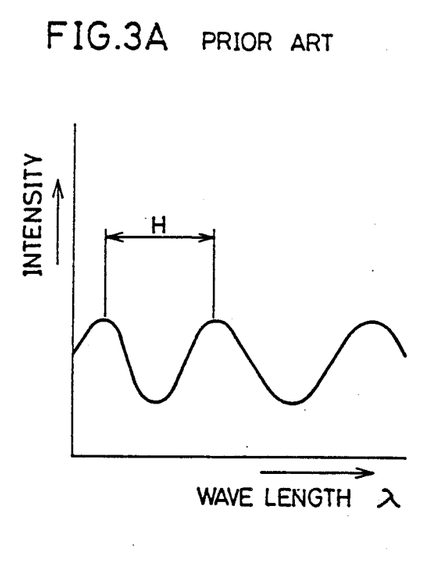
FIG. 3A shows spectral intensity when reflected light comprises a large proportion of signals.

The results of measuring the spectral intensity of such reflected light $L_2$ is shown FIG. 3A. The results shown in FIG. 3A occur when the proportion of the area occupied by the trench in the measured region of the surface is relatively large. As is apparent from FIG. 3A, the intensity distribution of the spectrum changes as a function of to the wavelength λ. The distance H between the wave crests of the change corresponds to the depth D of the trench 36.

The reason for this will be briefly described in the following.

Figure 4:
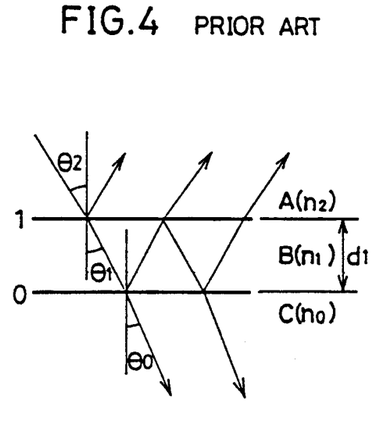
FIG. 4 illustrate a method of measuring thickness of a thin film.

FIG. 4 schematically illustrates a principle useful in measuring the thickness of a thin film. Referring to FIG. 4, A denotes an air layer, B denotes a single layer film and C denotes a substrate, having reflectances of $n_2$, $n_1$ and $n_0$, respectively. Lines with arrows show the direction of passing light. Although as a practical matter the light does not always impinge vertically, the reflectance $|R1|^2$ of the light can be represented by the following equation, in which it is assumed that the light impinges only vertically:

$$|R1|^2 = 1 - 4n_0 n_1^2 n_2 / \{n_1^2(n_0+n_1)^2 - (n_1^2-n_2^2)(n_0^2-n_1^2)\sin^2 \delta_1/2\} \quad (1)$$

where
$\delta_1 = 4\pi n_1 d_1/\lambda$
$d_1$ = thickness of the film (see FIG. 4)
λ = wavelength
(the above equation is disclosed in, for example, *Oyokogaku Gairon* (*Introduction to Applied Optics*) by Tsutusi et al., Kinpara Shuppan, pp. 217 to 218, 1969).

The value $|R_1(\lambda)|$ shown in the above equation (1) is a function of $\sin^2 \delta/2$. Therefore, the wave crests and wave troughs of the $|R_1(\lambda)|$ curve are repeated periodically by $\delta_1 = 4\pi n_1(\lambda)d_1/\lambda = 2\pi$ from the qualitative point of view. If the difference between the path taken by light reflected from the bottom of the trench and the path taken by light reflected from the surface of the wafer is an even number times the wavelength of the light, then the amplitude of the light is large. However, if the difference is an odd number times the wavelength of the light, the amplitude of the light is small. Therefore, assuming that the depth of the trench is uniform, the number of wave crests representing $|R_1(\lambda)|$ is dense if the wavelength is short, while the number is less dense if the wavelength is long.

Figure 3B:
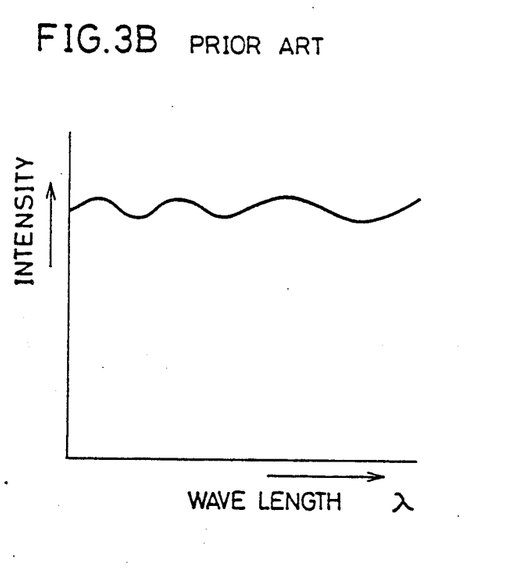
FIG. 3B shows spectral intensity where reflected light comprises a small proportion of signals.
Figure 5:
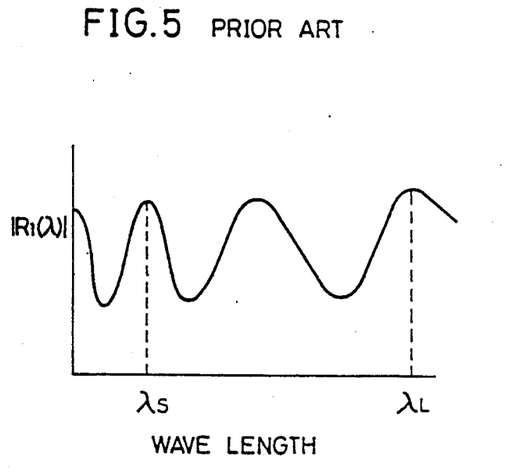
FIG. 5 shows spectral intensity of reflected light to illustrate the method of FIG. 5.

An example of the curve is shown in FIG. 5. FIG. 5 is a graph in which the x axis represents the wavelength while the y axis represents $|R_1(\lambda)|$. In FIG. 5, the following equations are satisfied:

$$4\pi n_1(\lambda_s)d_1/\lambda_s = m\pi$$
$$4\pi n_1(\lambda_2)d_1/\lambda_2 = (m+x)\pi$$

$$d_1 = \frac{|x|}{4} \cdot \frac{1}{\frac{n_1(\lambda_2)}{\lambda_s} - \frac{n_1(\lambda_2)}{\lambda_2}}$$

x: number of repetitions of wave crests and wave troughs
m: integer
$n_1(\lambda_s)$: reflectance of the film at wavelength $\lambda_s$
$n_1(\lambda_2)$: reflectance of the film at wavelength $\lambda_2$
$d_1$: thickness of the film Therefore, the thickness of the film can be measured from the number of peaks x in a certain wavelength range of and from the reflectance of the film to be measured. By applying this method, the depth of a trench can be measured when the thickness of the film is replaced with the depth of the trench. Thus, FIG. 5 corresponds to FIGS. 3A and 3B.

Since a trench formed on a sample such as a silicon wafer is extremely narrow as shown in FIG. 1, the total of the bottom area of trenches is in most cases less than 10% of the area of the region to be measured. If such sample is measured by a conventional method, a large portion of the reflected light will be regularly reflected from a flat portion of the sample surface 16A and not from the trench. Therefore, the proportion of the interferenced light derived from the microlevel difference to the total reflected light becomes extremely small. Consequently, when the light reflected from such sample surface is spectrally analyzed, the average intensity (the average of intensity at each wavelength) is high, and the amplitude (the intensity difference between a wave crest and a wave trough) is small as shown in FIG. 3B. In other words, all of the signals provided have a small amplitude relative to the average intensity. (This comparison is hereinafter referred to as "contrast"). Therefore, due to the low contrast the depth of the trench cannot be precisely measured. The intensity of the spectrum shown in FIG. 3A (in which the trench occupies a relatively large area) is lower than that of the spectrum shown in FIG. 3B (in which the trench occupies a relatively small area). The reason for this is that a relatively large amount of light is diffracted from the trench and the amount of light which enters the optical system (which converges the light reflected from the surface sample) is small. In order to solve the above described problems, the following method has been proposed.

The test pattern is measured by the above described method. The depth of the trench in the actual pattern is then estimated based on the result. However, this method comprises the following problems. Namely, since a test pattern which is not used as an actual device is formed on the silicon wafer surface, the total surface area of the wafer is unnecessarily increased. Thus, this method is particularly undesirable for forming a highly integrated semiconductor device. In addition, if the areas occupied by the trench in the test pattern and in the actual pattern are not accurately proportional to each other, the depth of the trenches in both patterns are liable to differ from each other in the manufacturing process. Consequently, even if the depth of the trench in the test pattern is precisely measured, the depth of the trench in the actual pattern cannot always be precisely measured based on the result of the measurement of the test pattern.

SUMMARY OF THE INVENTION

Therefore, an object of the present invention is to provide a method of and an apparatus for precisely measuring a microlevel difference even if the density of concave portions relative to convex portions formed on a sample surface is low.

Another object of the present invention is to provide a method of and an apparatus for measuring a microlevel difference without employing a complicated apparatus.

A further object of the present invention is to provide an apparatus which is capable of providing signals with less noise and in a simple structure.

A still further object of the present invention is to provide an apparatus difference which can be readily incorporated with a general metallurgical microscope to form a unit.

A still further object of the present invention is to provide a method of and an apparatus for precisely measuring the depth of a trench of a trench capacitor.

The above described objects of the present invention can be attained by an apparatus for measuring the distance between a main surface and a second surface. The apparatus includes means for receiving a main surface and a second surface; a light source for illuminating the main surface and the second surface; an optical system for condensing a first component of light which is regularly reflected from the main surface and a second component of interferenced light which is reflected from the main surface and the second surface; and reducing means for reducing the first component relative to the second component.

The above-described objects of the invention can also be attained by a method of measuring the distance between a main surface and a second surface. The method includes placing a sample on a stage (the sample includes a main surface and a second surface); illuminating the sample; reflecting a first component of light from the main surfaces (the first component includes substantially no interference); reflecting a second component of light from the main surface and the second surface (the second component is interfered and the interference corresponds to the distance between the main surface and the second surface); condensing the first and second components; and reducing the first component relative to the second component.

The above described objects of the invention can also be attained by a system for measuring a very small dimension between a main surface and a second surface. The system includes means for illuminating a main surface and a second surface to reflect light from the surfaces (the surfaces are separated by a very small dimension); means for analyzing interferenced light reflected from the surfaces to measure the very small dimension; and means for reducing a component of the light reflected from the surfaces to increase the contrast of the analyzed light and to enhance the measurement of the very small dimension.

With such an apparatus, method and system, the component comprises the above described components, the proportion of the second reflected light component to the total reflected light is increased, and a signal will be produced for detecting the microlevel difference. Therefore, an apparatus can be provided which is capable of precisely measuring a microlevel difference even if the density of the concave portions or convex portions is low.

According to a preferred embodiment, the means for reducing the first reflected light component comprises a means for intercepting the first reflected light component.

Since the apparatus comprises the above component, a measuring apparatus can be provided which is capable of obtaining signals for measuring a microlevel difference without complicated apparatuses.

According to a more preferred embodiment of the present invention, the illuminating light impinges on the main surface of the sample almost vertically; the first reflected light component is almost vertically reflected from the main surface of the sample; the second reflected light component is reflected from the main surface of the sample in arbitrary directions; the condensing optical system comprises an optical axis; and the light intercepting means intercepts light near the optical axis of the condensing optical system.

Since the apparatus comprises the above described components, an apparatus for measuring a microlevel difference can be provided which is capable of obtaining signals with less noise difference and in a simple structure.

According to a more preferred embodiment of the present invention, the light intercepting means comprises a glass mask having an intercepting portion formed at the center and transmissive portions formed on portions other than the light intercepting portion; and a half mirror provided between the glass mask and the condensing optical system for irradiating light from the light source onto the main surface of the sample and for bringing the reflected light to the glass mask.

Since the apparatus comprises the above described components, the whole apparatus can be readily incoroorated with a general metallurgical microscope.

Since the apparatus comprises the above described components, a half mirror for irradiating the sample surface and a glass mask for intercepting that light reflected from the main surface are provided independent from each other. Therefore, an apparatus is provided wherein the sample surface can be sufficiently illuminated and, at the same time, signals for detecting microlevel difference can be obtained.

According to a more preferred embodiment of the present invention, a method for measuring a microlevel difference comprises the steps of: placing a sample on a stage, the sample having a portion with a microlevel difference formed on a main surface thereof; illuminating the main surface of the sample by the light from a light source; reflecting a first reflected light component by interfering reflected lights corresponding to the microlevel difference; reflecting a second reflected light component by reflecting light only from the main surface of the sample, the second component comprising no interferenced light; condensing reflected light including the first and second reflected light components; and reducing the first reflected light component relative to the second reflected light component out of the condensed reflected light.

According to a preferred embodiment, the condenser optical system comprises an optical axis, and the step of reducing the first reflected light component relative to the second reflected light component reflected light comprises a step of intercepting the first component by intercepting light near the optical axis of the condenser optical system.

Since the method comprises the above described steps, the first reflected light component can be readily removed. Therefore, a method capable of readily measuring a microlevel difference can be provided.

These objects and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 6A:
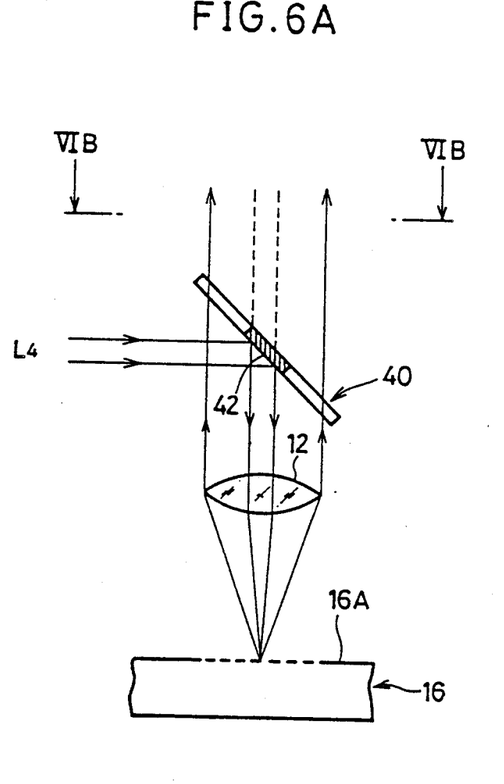
FIG. 6A illustrated an apparatus for; measuring microlevel difference in accordance with the present invention.
Figure 6B:
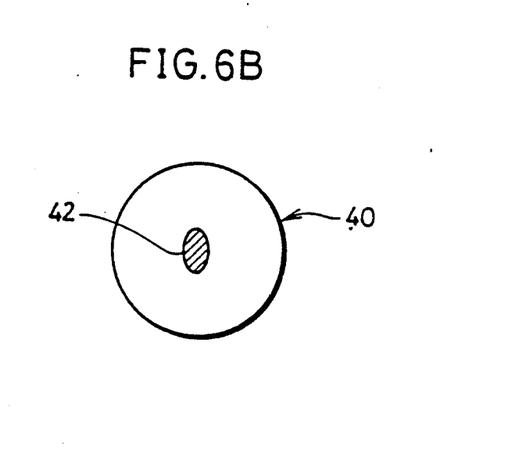
FIG. 6B is a cross sectional view taken along the line VIB—VIB of FIG. 6A.
Figure 7:
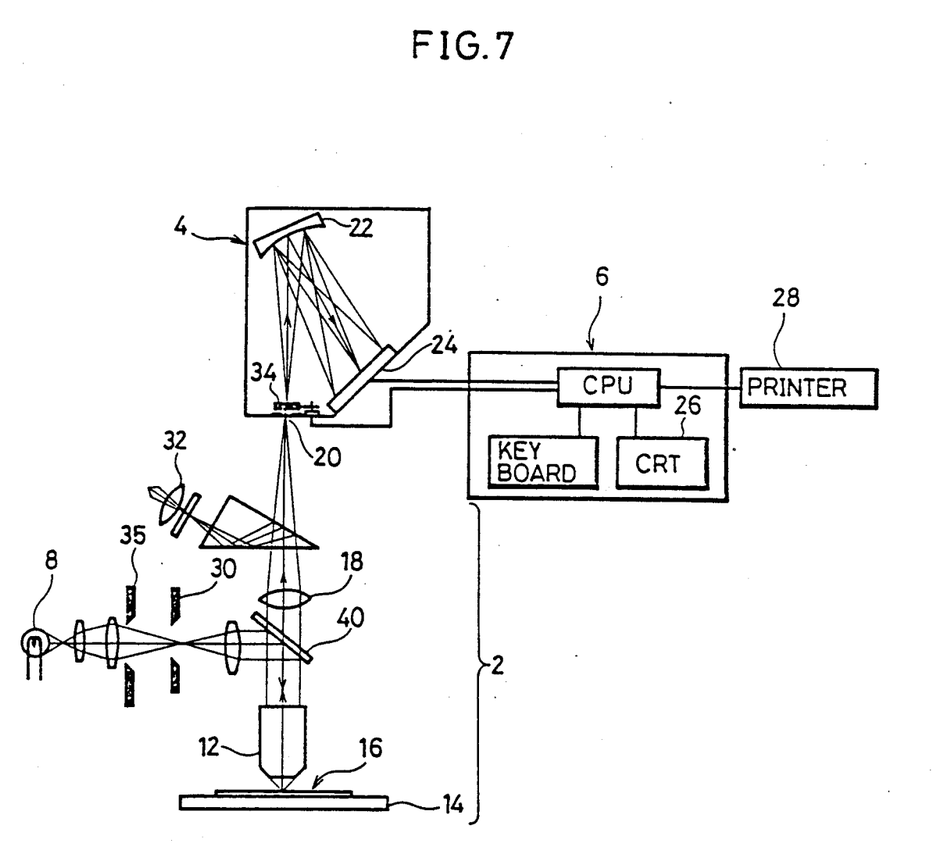
FIG. 7 shows a general metallurgical microscope within which the present invention is incorporated.

FIGS. 6A and 6B are schematic diagrams showing a main portion of a measuring apparatus in accordance with a first embodiment of the present invention. FIG. 7 is a schematic diagram of the whole structure of the apparatus.

Referring to FIG. 7, the apparatus comprises a common metallurgical microscope 2, spectrophotometry means consisting of a spectroscope 4, and a data processing portion 6.

A metallurgical microscope 2 comprises a light source 8 and an optical system including a special mirror 40, an image forming lens 18, an objective lens 12, etc.

The spectroscope 4 comprises a field diaphragm 30, a shutter 34, an apertured diaphragm 35, a concave surface diffraction grating 22, and a linear image sensor (hereinafter referred to as CCD) 24. The data processing portion 6 comprises a CPU, a keyboard and a CRT 26.

Visible white light emitted from the light source 8 is reflected by the special mirror 40, passes through an objective lens 12, which will be described later, reaches a surface of a sample 16 such as a silicon wafer set on a stage 14 and is reflected by the surface of the sample. The reflected light passes back through the objective lens 12 and impinges on an impinging pin hole 20 of the spectroscope 4 via the special mirror 40, the image forming lens 18 etc. The impinging pin hole 20 is arranged on the optical axis at a position where the image of a sample placed on the stage is formed. Therefore, light emitted from approximately a single point of the sample surface passes through the impinging pin hole 20 to reach the concave diffraction grating 22.

The concave diffraction grating 22 spectrally analyzes the to light received thereon. The resulting spectrum is converted into electrical signals by photoelectric converting means of the CCD 24. The electric signals are applied to the data processing portion 6. The data are arithmetically processed appropriately to determine the microlevel difference, with the result being applied to the CRT 26 or to a printer 28.

The light source 8 comprises a white illuminating lamp which irradiates visible white light. The objective lens 12 has the function of condensing light reflected from the same surface as well as the function of irradiating light from the source 8 onto the sample surface. The aperture of the diaphragm 35 is smaller than that of the objective lens 12. Consequently, the expansion of a bundle of rays of visible white light emitted from the objective lens 12 is less than that of the bundle of rays of reflected light entering the objective lens. More specifically, the diameter of the apertured diaphragm 35 is preferably adjusted to be 3 mm.

FIG. 6B is a plan view of the special mirror 40 viewed from section line VIB—VIB of FIG. 6A. Only the central portion of the special mirror 40 has a mirrored surface 42. Therefore, the central portion of the special mirror 40 has light intercepting characteristics. More specifically, the special mirror 40 comprises a regular reflecting region 42 formed by an aluminum film or the like on the central portion of a glass plate. The special mirror 40 is positioned at an angle of 45° to the incidental light in order to reflect the visible white light $L_4$ from the source vertically. The mirrored surface 42 is elliptical with a length of about 4.2 mm and a breadth of 3 mm. Thus, when the mirrored surface 42 is viewed from the irradiating direction it will appear circular. Portions of the special mirror 40 other than the mirrored surface 42 are transmissive. The special mirror 40 may be a half mirror.

The objective lens 12 is preferably designed such that the focal distance thereof is 9 mm and the optical axis thereof is substantially vertical to the sample surface.

The operation of the embodiment structured as described above will be described in the following.

The visible white light $L_4$ emitted from the light source is reflected by the mirrored surface 42 to enter the objective lens 12 and is converged to irradiate a small area of the sample surface 16A including the trench 36 and an area of surface 16A including the trench 36 and area of surface 16A immediately surrounding the trench 36. A portion of the visible white light $L_4$ which impinges on the sample surface 16A is regularly reflected. The visible white light $L_4$ impinging in the vicinity of the trench 36 is diffracted and returned to the objective lens 12. The light regularly reflected from the sample surface 16A passes near the center of the optical axis of the objective lens 12 to reach the special mirror 40. Since the mirrored surface 42 is formed on that portion where the regularly reflected light enters, the regularly reflected light is intercepted in this region. Therefore, the regularly reflected light does not proceed beyond the mirror (to the spectroscope 4).

Diffracted light returning from the sample surface 16A is widely distributed relative to the regularly reflected light. The diffracted light passes through the special mirror 40 with only a few portions thereof intercepted by the mirrored 42. The diffracted light which passes through the special mirror 40 is converged by the image forming lens 18 to enter the impinging pin hole 20 of the spectroscope 4.

In the first embodiment, the special mirror 40 serves as both a light intercepting means and as a directing means which reflects the visible white light from the light source 8 such that the light irradiates the sample surface substantially vertically. Compared with a case where the light intercepting means and the directing means are provided separately, the number of parts in the first embodiment reduced.

Second Embodiment

Figure 8:
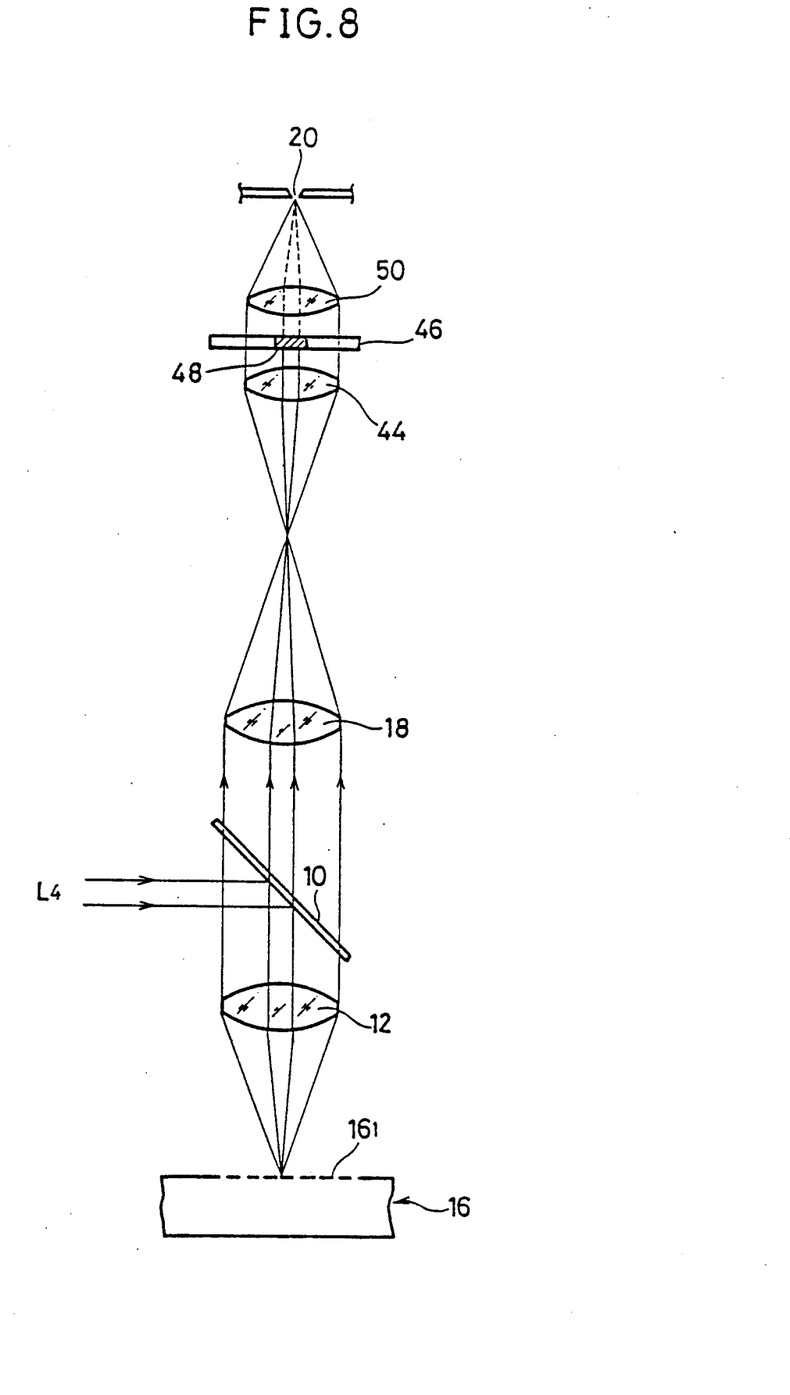
FIG. 8 shows a preferred actual application of the present invention.

FIG. 8 is a schematic diagram showing a main portion of a second embodiment of the present invention.

In this embodiment, the special mirror 40 is replaced with a half mirror 10 and a glass mask 46 having the central portion screened. In the second embodiment, the special mirror 40 for performing a light intercepting function.

In a general microscope, the rear focus point of an objective lens is either located in the objective lens or to the rear of the lens. If the glass mask 46 were set at the rear focus point of the objective lens, the illuminating light (visible white light) would itself be intercepted before entering the objective lens. Therefore, the illuminating light could not be used to irradiate the sample surface. Also, the glass mask 46 cannot be set at a position which is in a conjugate relation with the rear focus point of the objective lens 12. The reason for this is that such a position would be higher than the impinging pin hole of the spectroscope. Therefore, in the second embodiment, a lens system 44, 50 is provided in order to set the glass mask at an appropriate position.

A lens unit 44 is placed behind the rear focus point of the image forming lens 18. Consequently, the image forming position of the rear focus point of the objective lens is set and the glass mask 46 is set at the position. The glass mask 46 is a fully-transmissive glass plate, with a light intercepting film 48 (preferably having a diameter of 1 mm) formed at the central portion thereof. A lens unit 50 is arranged above the glass mask 46 and light converged by the lens unit 50 enters the impinging pin hole 20 of the spectroscope 4. In this embodiment, the diameter of the objective lens 12 is 10 mm, the focal distance thereof is 9 mm, the focal distance of the image forming lens 18 is 180 mm, the focal distance of the lens unit 44 is 50 mm and the focal distance of the lens unit 50 is 15 mm.

The operation of the second embodiment will be described in the following with reference to FIGS. 7 and 8.

The visible white light $L_4$ (adjusted by the apertured diaphragm such that the diameter of the bundle of rays at the position of the apertured diaphragm 35 is about 3 mm) is reflected vertically downwardly by the half mirror 10 to reach the sample surface $16_1$ through the objective lens 12. The regularly reflected light and the diffracted light from the sample surface 16A reach the glass mask 46 through the objective lens 12, the half mirror 10, the image forming lens 18 and the lens unit 44. The regularly reflected light reaching the glass mask 46 is intercepted by the light intercepting film 48 of the glass mask 46. The diffracted light is relatively widely distributed around the regularly reflected light and therefore passes through the transmissive portion around the light intercepting film 48 and enters the impinging pin hole 20 through the lens 50.

In the second embodiment, a common half mirror is used instead of the special mirror 40 of the first embodiment. Therefore, compared with the first embodiment, the second embodiment is more easily manufactured. In the second embodiment, since the light to the spectroscope passes through the half mirror, the light amount is slightly decreased. In the first embodiment, the amount of light to the spectroscope is not decreased.

Figure 9A:
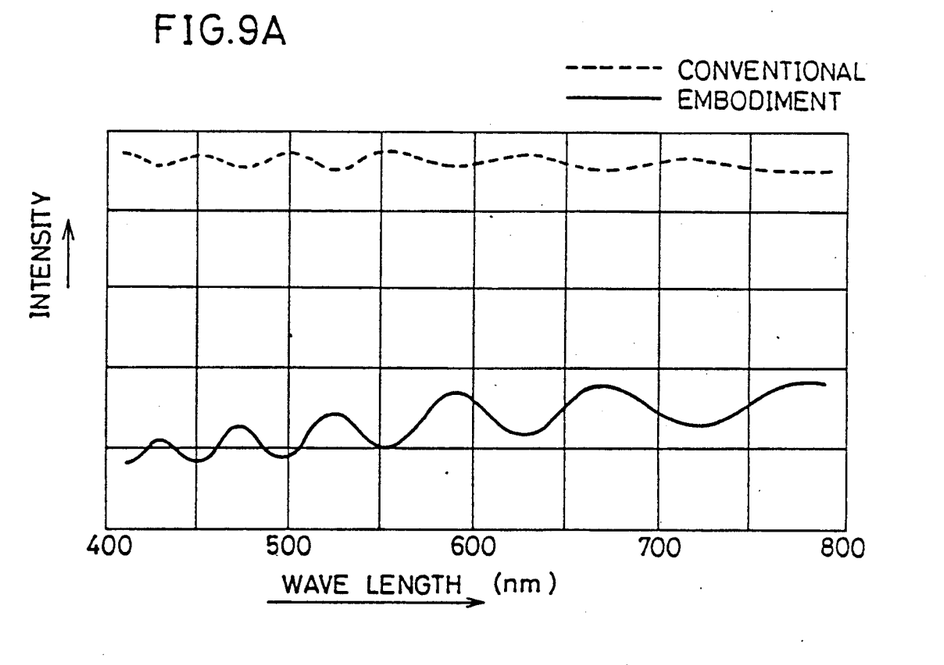
FIGS. 9A and 9B show spectral distribution of diffracted light entering a spectroscope in accordance with the first embodiment.
Figure 9B:
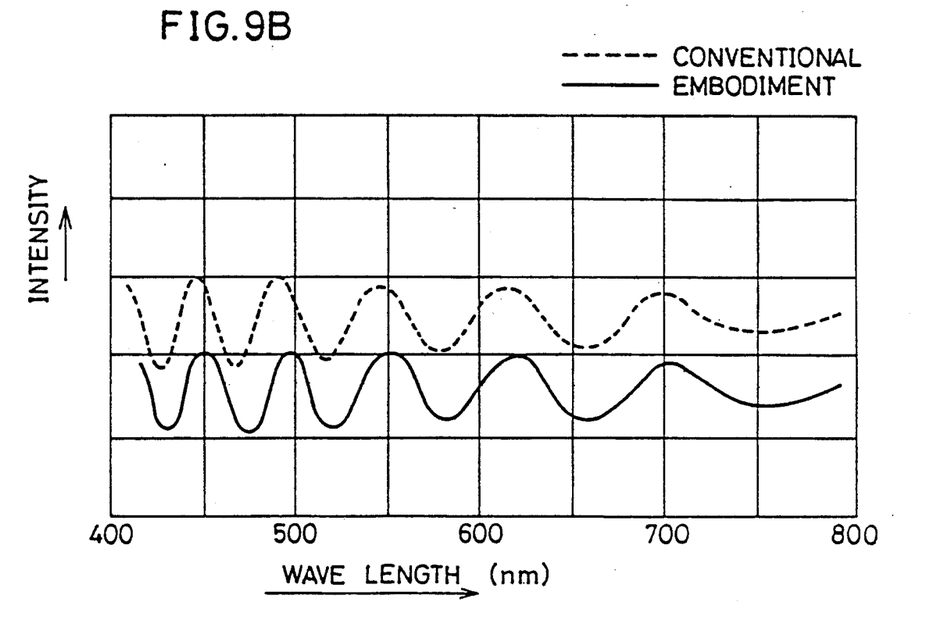

FIGS. 9A and 9B are graphs showing the spectral distribution obtained by spectrally analyzing the diffracted light entering the spectroscope in accordance with the first embodiment, compared with the prior art. The spectral distribution of the embodiment is denoted by a solid line while that of the prior art is shown by a dotted line. FIG. 9A is a spectral distribution of a sample in which the diameter of the opening of a hole is 1.5 μm, the depth of the same is 4 μm and the proportion of the area occupied by the hole is 8%. FIG. 9B is the spectral distribution of a sample having holes of the same shape and the proportion of the area occupied by the hole is 40%. Since the proportion of the diffracted light at the step portion of the sample surface to the total amount of the reflected light is high, a spectrum of light can be measured in which the influence of the interferenced light is larger than in the spectrum of the prior art. The spectrum has such characteristics that the amplitude, which is the intensity difference between the wave crest and the wave trough, is not minimized and the average intensity, which is the average of intensity at each wavelength, is suppressed. By suppressing the average intensity, a spectrum having high contrast can be obtained.

Although a light source emitting visible white light is employed in the above described embodiments, the present invention can employ any light source provided it irradiates light having continuous spectrum. The range of wavelengths is not limited to the visible range.

The light source need not irradiate light having continuous spectrum simultaneously. For example, it may irradiate light whose wavelength changes continuously.

In the above described embodiments, a spectroscope 4 comprising a concave diffraction grating 22 is employed. A prism may be used instead of the concave diffraction grating 22. The spectrum may be measured by an interference spectral method instead of the wavelength spectral method. In this embodiment, the irradiation of white light onto the sample surface should be approximately vertical to the sample surface, however, it need not be completely vertical. However, the bottom of the trench or concave portion must be irradiated.

Although the depth of a trench is measured in the above described embodiments, the above described apparatus can be used to measure the height of a convex portion i.e., a portion which projects from a flat surface.

In the apparatus in accordance with the present invention, a special mirror having an intercepting portion at the center or the like intercepts reflected light which is simply regularly reflected from the surface of the sample near the optical axis thereof. Meanwhile, interfered light reflected at the portions having microlevel difference, enters a spectroscope through the peripheral portion of the special mirror and the like. Therefore, the proportion of the light which is regularly reflected from the sample surface (which would be noise) to the diffracted light (non-regularly reflected light which will be the signal for measuring the microlevel difference) is considerably decreased. Namely, the signal to noise ratio in measurement is considerably improved. Consequently, an apparatus is provided which can precisely measure a microlevel difference even if the density of the concave portions formed on a sample surface is low.

Although the present invention has been described and illustrated in detail, it is clearly understood that the same is by way of illustration and example only and is not to be taken by way of limitation, the scope of the present invention being limited only by the terms of the appended claims.

What is claimed is:

1. An apparatus for measuring the distance between an upper surface and a lower surface of a sample, said apparatus comprising:
   means for holding said sample;
   a light source for illuminating said upper and lower surfaces in such a manner that light is reflected off of said surfaces, said light source impinging light substantially vertically onto said upper surface, said reflected light having a first component which is regularly reflected from said upper surface and a second component which represents interfered light reflected from said upper and lower surfaces;
   an optical system for condensing said reflected light, said optical system including an optical axis;
   reducing means for reducing said first component relative to said second component, said reducing means including means for intercepting said first component near said optical axis, said intercepting means including a mirror which includes:
   (1) a central portion and other portions;
   (2) a light intercepting portion formed at said central portion; and
   (3) transmissive portions formed at said other portions;
   a spectroscope for analyzing reflected light condensed by said optical system; and
   means for detecting spectrum of light analyzed by said spectroscope.

2. An apparatus according to claim 1, wherein:
   said light source includes a diaphragm and said diaphragm includes a first aperture;
   said optical system includes a second aperture; and
   said first aperture is smaller than said second aperture.

* * * * *